(12) United States Patent
Haah et al.

(10) Patent No.: US 12,499,380 B2
(45) Date of Patent: Dec. 16, 2025

(54) TIME-EFFICIENT LEARNING OF QUANTUM HAMILTONIANS FROM HIGH-TEMPERATURE GIBBS STATES

(71) Applicant: Microsoft Technology Licensing, LLC, Redmond, WA (US)

(72) Inventors: Jeongwan Haah, Bellevue, WA (US); Robin Ashok Kothari, Seattle, WA (US); Ewin Tang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1233 days.

(21) Appl. No.: 17/337,337

(22) Filed: Jun. 2, 2021

(65) Prior Publication Data

US 2023/0030383 A1    Feb. 2, 2023

(51) Int. Cl.
*G06N 10/00*    (2022.01)
*G06N 7/01*     (2023.01)
*G06N 20/00*    (2019.01)

(52) U.S. Cl.
CPC ............. *G06N 10/00* (2019.01); *G06N 7/01* (2023.01); *G06N 20/00* (2019.01)

(58) Field of Classification Search
CPC ........ G06N 10/60; G06N 10/00; G06N 10/20; G06N 10/70; G06N 20/00; G06N 7/01
See application file for complete search history.

(56) References Cited

U.S. PATENT DOCUMENTS

2020/0169396 A1* 5/2020 Neven ................... G06N 3/063

OTHER PUBLICATIONS

Duviryak et al., "Classical relativistic system of N charges. Hamiltonian description, forms of dynamics, and partition function," Condensed Matter Physics (2001) (Year: 2001).*
Geraci et al., "Classical Ising model test for quantum circuit," arXiv (2009) (Year: 2009).*
Hamilton et al., "Information theoretic Propeties of Markov Random Fields, and their Algorithmic Applications," arXiv (2017) (Year: 2017).*
Bermejo-Vega, et al., "Architectures for quantum simulation showing a quantum speedup," arXiv (2017) (Year: 2017).*
David L. Goodwin, "Advanced Optimal Control Methods for Spin Systems," arXiv (2018) [thesis] (Year: 2018).*
Anshu et al., "Sample-Efficient Learning of Quantum Many-Body Systems," arXiv (2018) (Year: 2018).*

(Continued)

*Primary Examiner* — Kakali Chaki
*Assistant Examiner* — Kevin L. Smith
(74) *Attorney, Agent, or Firm* — Cantor Colburn LLP; Stephen A Wight

(57) ABSTRACT

Embodiments of the present disclosure include systems and methods for reducing a sample complexity and a time complexity associated with noise-robust characterization of a quantum device. A plurality of copies of a Gibbs state of the quantum device in thermal equilibrium at a high-temperature. A plurality of estimates for expectation values of the plurality of copies of the Gibbs state. A plurality of cluster derivatives for a plurality of connected clusters of a low-degree Hamiltonian are calculated. A function is inverted on the plurality of estimates based on the plurality of cluster derivatives and a set of Hamiltonian coefficients are estimated for the low-degree Hamiltonian of the quantum device.

20 Claims, 8 Drawing Sheets

(56) References Cited

OTHER PUBLICATIONS

Gilyen et al., Quantum-inspired low-rank stochastic regression with logarithmic dependence on the dimension, arXiv (2018) (Year: 2018).*

Anshu et al., "Sample-efficient learning of interacting quantum systems," Nature Physics (May 2021) (Year: 2021).*

Harrow et al., "Quantum Algorithm for Linear Systems of Equations," arXiv (2009) (Year: 2009).*

Jeongwan Haah, "Product Decomposition of Periodic Functions in Quantum Signal Processing," arXiv (May 2020) (Year: 2020).*

Harrow, et al., "Classical Algorithms, Correlation Decay, and Complex Zeros of Partition Functions of Quantum Many-body Systems", In Repository of arXiv:1910.09071v1, Oct. 20, 2019, 54 Pages.

"International Search Report and Written Opinion Issued in PCT Application No. PCT/US2022/031668", Mailed Date: Sep. 20, 2022. 15 pages.

Ramezani, et al., "Impact of Nonideal Cycles on the Efficiency of Quantum Heat Engines", In the European Physical Journal D, vol. 73, Issue 7, Jul. 18, 2019, 8 Pages.

Anshu, et al., "Sample-Efficient Learning of Quantum Many-Body Systems", In Repository of arXiv:2004.07266, Apr. 17, 2020, 60 Pages.

Kuwahara, et al., "Clustering of Conditional Mutual Information for Quantum Gibbs States above a Threshold Temperature", In Journal of Physical Review Letters, vol. 124, Issue 22, Jun. 1, 2020, 24 Pages.

Kuwahara, et al., "Gaussian Concentration Bound and Ensemble Equivalence in Generic Quantum Many-Body Systems Including Long-Range Interactions", Phys. Rev. Lett., vol. 124, Iss. 11, Jun. 5, 2020, 28 Pages.

Rudin, Walter, "Real and Complex Analysis", In Publication of McGraw-Hill, Third Edition, 1987, 426 Pages.

* cited by examiner

TIME-EFFICIENT LEARNING OF QUANTUM HAMILTONIANS FROM HIGH-TEMPERATURE GIBBS STATES

BACKGROUND

Machine learning and statistical inference techniques have been successfully implemented to process high dimensional data that is unreasonably difficult or time-consuming for classical computing techniques to solve. Markov Random Fields and undirected graphical models, for instance, have been applied in machine learning to solve certain classes of problems involving high dimensional data, such as signal processing, biochemistry, and computer vision. There has been increasing interest to implement learning techniques to solve some quantum many-body systems that involve exponentially large state spaces.

A persistent problem to implementing learning techniques in such systems is quantum decoherence or "noise." Quantum computing systems, for instance, are increasing in size and capability to execute quantum algorithms involving larger number of qubits and higher levels of entanglement. However, noise has been a major obstacle to the production of large-scale quantum computers. Although some progress has been made to reduce the noise in such systems (e.g., via topology), the intricate nature of the underlying interactions between particles in such systems has inhibited the development of techniques that can learn to process quantum systems in a time-efficient manner and with a reasonable sample complexity. More generally, noise in quantum many-body systems impedes the ability to learn properties of a quantum device, such as spin states or orbital states of its constituent particles.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Embodiments disclosed herein relate to quantum systems and, more particularly, to systems and methods involving a quantum device and a computing system. The following description addresses a problem that is at the intersection of quantum many-body physics and machine learning: learning the Hamiltonian of a quantum system from copies of a Gibbs state of the quantum system. In general, the Hamiltonian of a quantum system is a quantum mechanical operator that indicates how the constituents of the system interact with each other and how the system evolves over time, which is governed by the Schrödinger equation. The Hamiltonian may also indicate what the equilibrium state of the quantum system will be when it is in contact with an environment.

In the Hamiltonian learning problem, a quantum system has an unknown Hamiltonian H that belongs to a known class of reasonable Hamiltonians, such as geometrically local Hamiltonians. A plurality of copies of a Gibbs state of the quantum system are obtained at a given inverse temperature $\beta$. According to one or more embodiments herein, the Hamiltonian H is learned using these Gibbs state copies while minimizing the number of copies of the Gibbs states obtained and the processing time involved to learn the Hamiltonian H.

As described above, noise in quantum devices is a significant challenge to efficiently characterizing or validating properties thereof. Some quantum algorithms have been implemented on quantum processors to learn or determine the quantum Hamiltonian of an unknown quantum system having structures on a quantum scale (e.g., having dimensions comprising a discrete number of qubits). At least some of these quantum algorithms are susceptible to noise and require the use of a quantum processor, which is a complex and costly solution. Embodiments described herein implement a special class of Hamiltonians that can be learned via classical models not executed on a quantum processor and that limit the sample complexity and time complexity of the systems and methods involved. Moreover, embodiments disclosed herein are robust to decoherence, thereby improving the ability of a system to characterize or validate aspects of a quantum device in the presence of noise.

Figure 1:
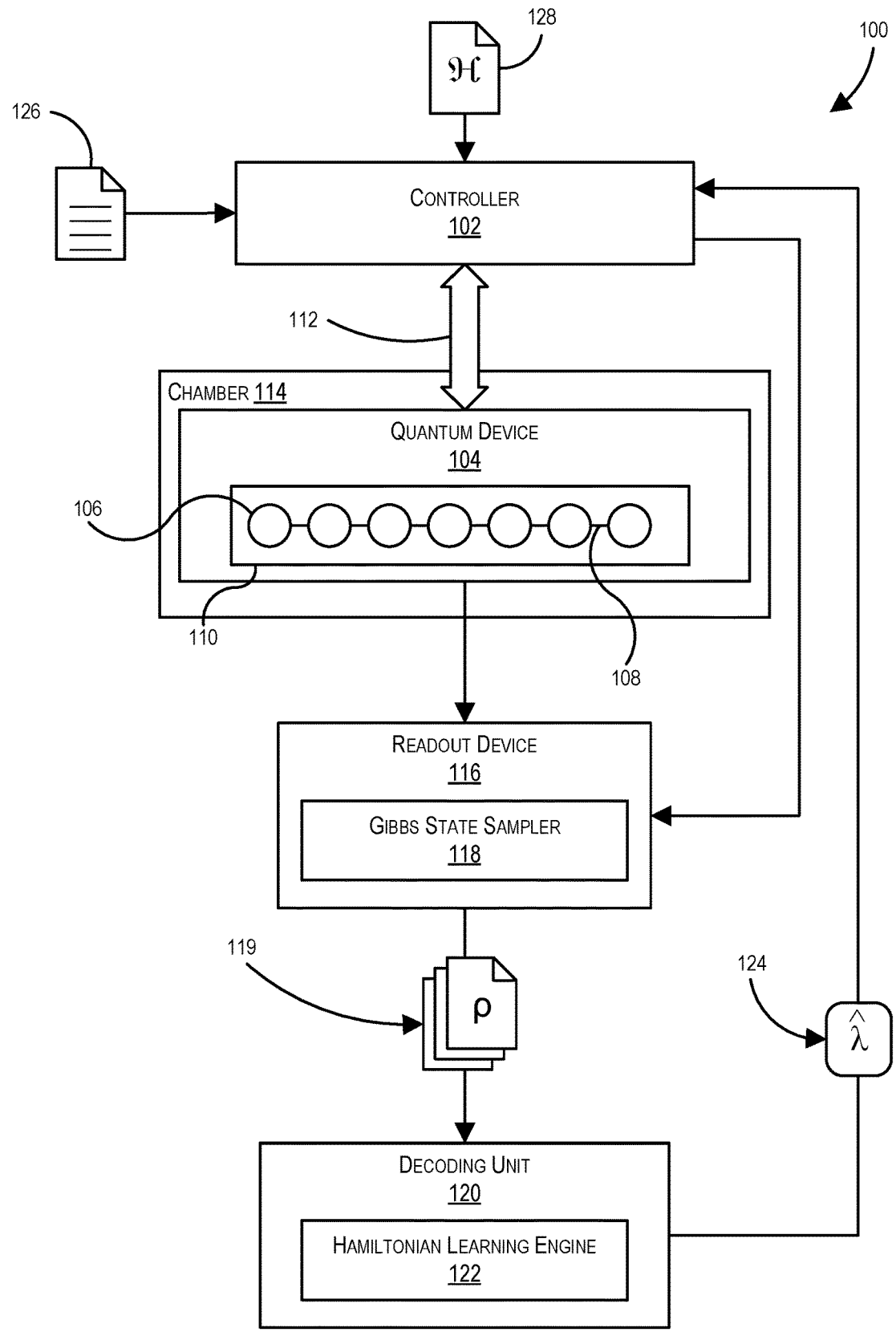
FIG. 1 illustrates an example computing system in which Hamiltonian learning of a quantum device is implemented.

FIG. 1 illustrates an example quantum system 100 that implements Hamiltonian learning according to one or more embodiments. The quantum system 100 includes a controller 102 that controls and interacts with other parts of the quantum system 100. The controller 102 includes one or more processors and is configured with logic causing the controller 102 to perform as described herein. In some embodiments, the one or more processors of the controller 102 may be operatively coupled to peripheral devices or components, such as input devices (e.g., mouse, keyboard) for receiving user input or network devices that enable remote operation of the controller 102. The one or more processors of the control 102 may take the form of a central processing unit (CPU), a graphics processing unit (GPU), or similar processors.

The controller 102 may comprise classical electronic components or circuitry in at least some embodiments. The terms "classical" and "non-quantum," as used herein, refer to components that can be modeled accurately as a collection of particles without consideration for the quantum state of any individual particle. Non-limiting examples of classical electronic components include integrated circuits, transistors, resistors, and capacitors. The controller 102 may include or otherwise be operatively coupled to memory configured to store program instructions that, as a result of execution by the one or more processors, cause the controller 102 to perform as described herein. The memory associated with the controller 102 may also be configured to hold additional data that influence operation of a quantum processor during run time, such as by providing control input for one or more quantum-gate operations. The controller 102 includes one or more inputs for receiving data or instructions from other devices described herein and includes one or more outputs for providing output data to or controlling other devices described herein. The input(s) and output(s) include analog and/or digital lines.

The quantum system 100 includes a quantum device 104 that has a plurality of particles 106 and one or more connections 108 between two or more of the particles 106. In some embodiments, the plurality of particles 106 are disposed on a substrate 110. The quantum device 104 is a device in which each of the plurality of particles 106 has a discrete number of quantum states in which the particles 106 can exist. In some embodiments, the quantum device 104 is a quantum computing processor, the plurality of particles 106 is an array of qubits, and each of the connections 108 corresponds to a quantum logic gate operating on two or more of the qubits. The qubits may be arranged as a 2-dimensional array in some embodiments or may be arranged as a 3-dimensional array in some embodiments.

In some embodiments, the quantum device 104 may be a semiconductor comprised of crystalline or polycrystalline structures in which the particles 106 are arranged in a highly ordered structure. In some embodiments, the quantum device 104 may be made of graphene. In some embodiments, the quantum device 104 may be comprised of a superconducting material.

The controller 102 is operatively coupled to the quantum device 104 via an interface 112. In particular, the interface 112 is configured to obtain a temperature measurement of the quantum device 104 to a fine-degree sufficient to determine whether the quantum device 104 is in thermal equilibrium. In some embodiments, the quantum device 104 may be in an environmentally controlled enclosure or chamber 114 that is operably coupled to the controller 102. The controller 102 may include control circuitry operable to control one or more physical conditions to which the chamber 114 subjects the quantum device 104. In some embodiments, the controller 102 interacts with the quantum device 104 via the interface 112 to implement a set of desired quantum-gate operations. The controller 102 may also encode an input quantum state into the qubits via the interface 112.

In some embodiments, the chamber 114 may be controlled to adjust a temperature of the quantum device 104. For instance, a temperature within the chamber 114 may be controlled to near absolute zero (e.g., ~15 milliKelvin). The temperature within the chamber 114 may be adjusted to higher temperatures greater than a critical temperature TC of the quantum device 104, as described elsewhere herein. In some embodiments, other physical conditions of the chamber 114 may be controlled. For instance, the chamber 114 may be controlled to subject the quantum device 104 to an electromagnetic field and the chamber 114 may control characteristics (e.g., direction, flux) of the electromagnetic field. The chamber 114 is also configured to shield or insulate the quantum device 104 from environmental conditions external to the chamber 114.

The quantum system 100 includes a readout device 116 that is configured to receive information regarding a state of the quantum device 104. In particular, the readout device 116 includes a Gibbs state sampler 118 that obtains a copy of the Gibbs state of the quantum device 104 for a given time. The Gibbs state sampler 118, for example, may sample the quantum thermal state of the quantum device 104 as a statistical distribution or mixture of quantum states of the quantum device 104, such as by measuring a thermal distribution associated with the quantum device. The Gibbs state ρ of the quantum device 104 corresponds to a density operator and is defined by the following Equation 1:

$$\rho = \frac{e^{-\beta H}}{Tr(e^{-\beta H})} \quad [1]$$

where β is inverse temperature, H is the Hamiltonian, and Tr( ) is the trace function. The controller 102 is operatively coupled to the readout device 116 and is configured (e.g., via logic) to control the readout device 116 to obtain a copy of the Gibbs state of the quantum device 104 as a result of a determination by the controller 102 that the quantum device 104 is in thermal equilibrium.

The controller 102 controls the readout device 116 to obtain a plurality of copies 119 of the Gibbs state, each Gibbs state copy obtained for a time at which the controller 102 determines that the quantum device 104 is in thermal equilibrium. In connection with obtaining a copy of a Gibbs state, the controller 102 may adjust environmental conditions to which the quantum device 104 is exposed. As one example, for a first copy of the Gibbs state, the controller 102 may control the chamber 114 to a first desired temperature and then wait until the quantum device 104 is at thermal equilibrium. As a result of determining that the quantum device 104 is in thermal equilibrium, the controller 102 controls the readout device 116 to obtain a first copy of the Gibbs state of the quantum device 104. Then, the controller 102 may control the chamber 114 to a second desired temperature and then wait until the quantum device 104 is at thermal equilibrium before obtaining a second copy of the Gibbs state of the quantum device 104. The controller 102 may control the readout device 116 to obtain an additional number of copies of the Gibbs states each corresponding to a desired temperature, as described elsewhere herein.

In some implementations, the controller 102 may, after a obtaining the first copy of the Gibbs state for the first desired temperature, adjust a temperature of the chamber 114 to a second temperature for a given time period. Then, the controller 102 may adjust the temperature of the chamber 114 back to the first desired temperature and wait until the quantum device 104 is in thermal equilibrium before taking another copy of the Gibbs state.

The quantum system 100 further includes a decoding unit 120 that receives and processes information provided by the readout device 116. In particular, the decoding unit 120 includes a Hamiltonian learning engine 122 that obtains the plurality of copies 119 of the Gibbs state of the quantum device 104. The decoding unit 120 may be implemented as hardware, software, or a combination thereof. In some embodiments, for example, the decoding unit 120 may be embodied as computer-executable instructions stored on memory and executing on one or more processing units, execution of the instructions on the one or more processors causing the one or more processors to perform as described herein. In some embodiments, the decoding unit 120 may be embodied as hardware (e.g., a field-programmable gate array, application specific integrated circuit, system on chip) having hardwired logic that causes the hardware to perform as described herein. In some embodiments, the decoding unit 120 may be part of the controller 102.

The Hamiltonian learning engine 122 learns a Hamiltonian H of the quantum device 104 based on the plurality of copies 119 of the Gibbs state obtained by the Gibbs state sampler 118. The Hamiltonian H indicates how the particles 106 interact with each other and how the quantum device 104 evolves over time, as governed by the Schrödinger equation. The Hamiltonian H may also indicate what the equilibrium state of the quantum device 104 will be when it is in contact with the environment of the chamber 114. The Hamiltonian learning engine 122 is configured to implement a set of processes for learning or determining information 124 regarding the Hamiltonian H. For example, the Hamiltonian information 124 generated by the Hamiltonian learning engine 122 may include a set of estimates $\hat{\lambda}$ for coefficients of the Hamiltonian H. Description of the techniques utilized by the Hamiltonian learning engine 122 are described in greater detail below.

As a result of processing the Gibbs state copies, the decoding unit 120 provides information including the Hamiltonian H learned to the controller 102. The controller 102 may process the information and provide information including or regarding the Hamiltonian H to a user. The Hamiltonian H is useable, for example, to characterize or validate physical or quantum properties of the quantum device 104.

In some embodiments, the controller 102 may receive instructions 126 for implementing a quantum algorithm on a quantum processor—the quantum device 104 in this instance. The instructions 126, as a result of execution by the controller 102, cause the controller 102 to set quantum states of the quantum device 104 (e.g., set states of the qubits, evolve quantum state of the quantum processor), implement quantum logic gates for the qubits, and obtain measurements of qubits, and/or establish environmental conditions of the chamber 114 (e.g., temperature, magnetic field flux). In some embodiments, the controller 102 may receive one or more intended Hamiltonians 128 for the quantum device 104. The intended Hamiltonians 128 may be used to verify operation of the quantum device 104, as discussed below in further detail with respect to FIG. 6 and elsewhere.

Figure 2:
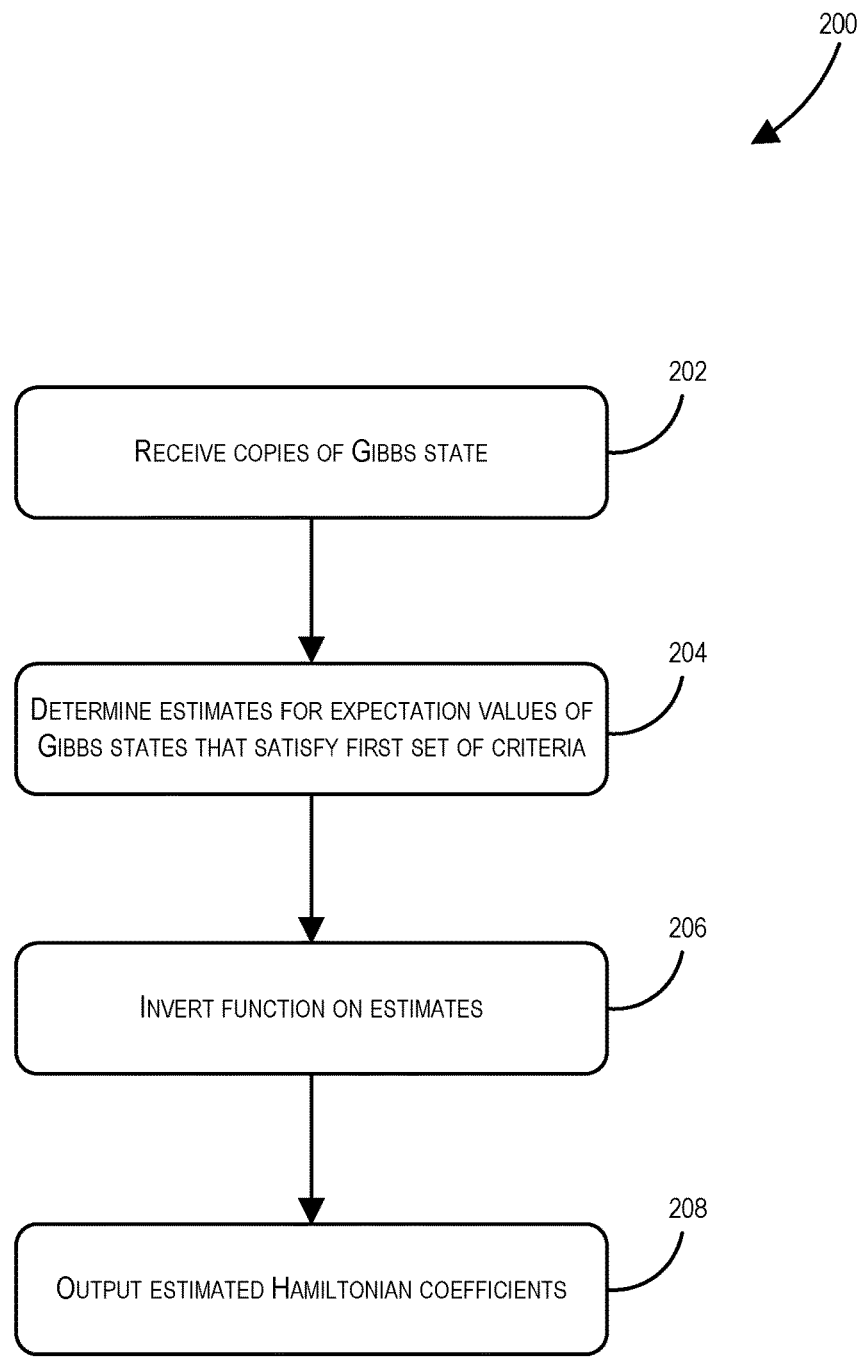
FIG. 2 illustrates a method for learning a Hamiltonian of the quantum device 104 of FIG. 1 according to one or more embodiments.

FIG. 2 shows a method 200 for learning a Hamiltonian H of the quantum device 104 according to one or more embodiments. The method 200 and parts thereof may be performed by one or more entities described herein, such as the decoding unit 120, the controller 102, and/or the readout device 116. In the method 200, the target Hamiltonian H to be learned is a collection of tuples (a, $E_a$, $\lambda_a$), where a is an index ranging over some finite set of N elements (e.g., particles 106) corresponding to a set [N]={1, 2, ..., N}; $E_a$ is a Hermitian operator of operator norm (="→2"-norm=Schatten ∞-norm) at most 1 acting on a Hilbert space of dimension D, which is a power of 2 as a result of the particles 106 (e.g., qubits) comprising the Hilbert space; and $\lambda_a$ is a Hamiltonian term coefficient that is a real number between −1 and +1. The Hamiltonian operator H is defined to be H=$\Sigma_a \lambda_a E_a$.

With respect to this decomposition of the Hilbert space into particles 106, the support Supp(P) of an operator P is the minimal set of particles 106 such that P can be written as P=$0_{Supp(P)} \otimes I_{Supp(P)^c}$ for some operator O. Associated with a Hamiltonian {(a, $E_a$, $\lambda_a$):a∈ [N]}, there is an undirected dual interaction graph 𝔊 defined by a vertex set [N] having edges between a≠b if and only if Supp($E_a$)∩Supp($E_b$)≠∅, wherein the graph 𝔊 has a maximum degree $\mathfrak{b}$ over all vertices of the graph. It is noted that if $E_a$=$E_b$ for a condition a≠b, there is an edge of the graph 𝔊 between a and b.

When the maximum degree $\mathfrak{b}$ is independent of the vertex set [N], if any Hamiltonian term $E_a$ acts on a constant number of particles 106, and any particle 106 is involved in a constant number of terms, all with respect to N, then the maximum degree b of the graph 𝔊 will also be constant. More concretely, if we have a directed graph G with a particle 106 on each vertex and a two-particle Hermitian operator for each edge (which may require direction on each edge), then the graph 𝔊 will have a maximum degree of $\mathfrak{b} \leq 2(d-1)$, where d is the degree of the number of edges G of the graph 𝔊 and the number of vertices of the graph 𝔊 is the number of edges of G.

A class of Hamiltonians involved in the method 200 disclosed herein are geometrically local Hamiltonians on Euclidean space ℝ having a dimension D. For this special class of Hamiltonians, there is a constant number of particles 106 (e.g., qubits) on each lattice point, an element of $\mathbb{Z}^D \subset \mathbb{R}^D$, and a Hermitian operator is defined for each hypercube. For such conditions, the dual interaction graph 𝔊 has a maximum degree $\mathfrak{b} \leq 3^D - 1$. The Hamiltonian H to be learned in the method 200 is a low-degree Hamiltonian on the plurality of particles 106, wherein the number of the plurality of particles 106 is N, the $\ell_2$ error ε is greater than zero, and the inverse temperature β less than the inverse critical temperature $\beta_c$, which depends on a degree of the dual interaction graph 𝔊. Specifically, the inverse critical temperature $\beta_c$ is as follows:

$$\beta_c = \frac{1}{25} e^{-7} (\mathfrak{b} + 1)^{-10}$$

wherein $\mathfrak{b}$ is the maximum degree of the dual interaction graph 𝔊.

The Gibbs state of the low-degree Hamiltonian {(a, $E_a$, $\lambda_a$)} is defined by Equation 1 supra wherein the inverse temperature β is greater than zero. Additionally, the operators $E_a$ of the low-degree Hamiltonian are Hermitian, traceless, and orthonormal with respect to the normalized Hilbert-Schmidt inner product, which means they satisfy the condition ∀a, b∈ [N]: Tr($E_a E_b$)=D$\delta_{ab}$, where $\delta_{ab}$ is the Kronecker delta function.

The term "low-degree Hamiltonian," as used herein, refers to a Hamiltonian for which each operator $E_a$ is supported on a constant number of particles 106 without any geometric constraints. For each operator $E_a$, there are a constant number of other operators $E_b$ with which operator $E_a$ has common support. A geometrically local Hamiltonian in any constant-dimensional space is low-degree, but the converse is not necessarily true. For example, if we arrange qubits (corresponding to the particles 106) on the vertices of a constant-degree expander graph, and let edges denote 2-qubit interaction terms, such a Hamiltonian would be a low-degree Hamiltonian, but not a geometrically local Hamiltonian in any constant-dimensional Euclidean space.

In view of the foregoing considerations, at 202 of the method 200, the decoding unit 120 obtains the plurality of copies 119 of the Gibbs state ρ of the quantum device 104 from the readout device 116. In some embodiments, the decoding device 120 successively receives individual copies of the Gibbs state as the copies are obtained by the readout device 116. In some embodiments, the Hamiltonian learning engine 122 collectively receives the plurality of copies 119 of the Gibbs state as a collection of copies from the readout device 116. The number of copies of the Gibbs state received in 202 and used in the subsequent parts of the method 200 depends on several factors, as discussed below in greater detail (see, e.g., 204 of method 200), but is generally a function of the number of particles 106, the inverse temperature β of the quantum device 104, and the error norm ε desired.

At 204, the decoding unit 120 determines estimates for expectation values of the Gibbs state ρ copies that satisfy a first set of criteria. In particular, at 204, the Hamiltonian learning engine 122 determines estimates $\hat{E}_a$ for all of the expectation values $\langle E_a \rangle(\lambda) = \mathrm{Tr}(E_a\rho(\lambda))$, the estimates $\hat{E}_a$ satisfying a set of criteria such that $|\hat{E}_a - \langle E_a \rangle(\lambda)| \leq \beta\varepsilon$ error with a success probability of at least $1-\delta$ for all $a \in E[M]$ using a given number of copies of the Gibbs state ρ received in 202.

Determining the estimates $\hat{E}_a$ involves estimating the function $\mathrm{Tr}(E_a\rho(\lambda))$ to accuracy ε with success probability of at least $1-\delta$ for an $\mu E \mu \leq 1$ and a Gibbs state ρ. In particular, the Gibbs state ρ is measured in the eigenbasis of the operator E. Then, an output of the corresponding eigenvalue of E is generated based on the measurement. The output is the estimate $\hat{E}_a$, which is a random variable with an expected value $\mathrm{Tr}(E\rho)$ and, since $\mu E \mu \leq 1$, the random variable has a range of continuous values on $[-1,1]$. By the Chernoff bound, the estimate $\hat{E}_a$ of the function $\mathrm{Tr}(E_a\rho(\lambda))$ is estimated to an additive error ε with probability of at least $1-\delta$ using $0(\log(1/\delta)/\varepsilon^2)$ copies of the Gibbs state ρ. In practice, an output of each function $\mathrm{Tr}(E_a\rho(\lambda))$ has a binary value, $\pm 1$, since E is assumed to be a Pauli operator. After obtaining a number of outputs of the function $\mathrm{Tr}(E_a\rho(\lambda))$, the estimate $\hat{E}_a$ can be calculated as an average of the binary values of the +1 and −1s and has a value in the range [−1, +1]. The empirical error ε on the estimate $\hat{E}_a$ is the empirical standard deviation of the outcomes. The estimate $\hat{E}_a$ is sufficiently accurate when the empirical standard deviation is smaller than βε.

All the observables $E_a$ of the Hamiltonian $\{(a, E_a, \lambda_a): a \in [M]\}$ on N particles 106 are measured (e.g., by the readout device 116); however, most of the observables $E_a$ act on independent sets of the particles 106. To determine the estimates $\hat{E}_a$, in a $(\mathfrak{d}+1)$-coloring of the graph $\mathfrak{G}$, the estimates $\hat{E}_a$ of a particular color act on separate particles 106. Because the measurements commute, a number M of the estimates $\hat{E}_a$ are obtained for all the observables $E_a$ of a particular color using the same Gibbs state ρ. To ensure that all M estimates are correct with probability of at least $1-\delta$, each of the estimates $\hat{E}_a$ has a failure probability of at most $\delta/M$ to satisfy the union bound (a.k.a. Boole's inequality). Thus, the number of copies of the Gibbs state ρ received in 202 for estimating all M observables to error βε is $$O\left(\frac{\mathfrak{d}}{\beta^2\varepsilon^2}\log\left(\frac{M}{\delta}\right)\right).$$

At 206, the method 200 includes inverting the function $x \mapsto \langle E_a \rangle(x)$ on the estimates $\hat{E}_a$ to find estimates of the coefficients $\hat{x}$. The estimates $\hat{E}$ determined in 204 are used to determine an x (estimate) corresponding to the Hamiltonian coefficients λ such that $\|x=\lambda\|_\infty = 0(\varepsilon)$. Specifically, in 206, an $x \in [-1,1]^M$ is determined such that $\|\mathcal{F})(x)\|_{28} = 0(\beta\varepsilon)$. The process of inverting the function $x \mapsto \langle E_a \rangle(x)$ on the estimates $\langle (E_a) \rangle(x)$ for all expectation values $\langle E_a \rangle(\lambda) = \mathrm{Tr}E_a\rho$ (λ)) involves performing a modified version of Newton's method, as described with respect to FIG. 3 and elsewhere herein.

Recall that the quantum device 104 has a number n particles 106 (e.g., qubits), the Hamiltonian $H = \Sigma_{a=1}^N \lambda_a E_a$ has N terms, and the operators $E_a$ are known Hermitian operators with $\|E_a\| \leq 1$, wherein $\|\cdot\|$ denotes the usual operator norm or spectral norm, the coefficients satisfy $\lambda_a \in [-1,1]$ for all $a \in [N]$, and [N] refers to the set $\{1, 2, \ldots, N\}$. Also recall that every term $E_a$ of a Hamiltonian $\{(a, E_a, \lambda_a)\}$ is traceless. Then, for every term a, we have a Taylor series expansion of the Gibbs state ρ according to the following Equation 2:

$$\frac{\mathrm{Tr}(E_a e^{-\beta H})}{\mathrm{Tr}(e^{-\beta H})} = \beta p_1 + \beta^2 p_2 + \ldots + \beta^N p_N \qquad [2]$$

where the foregoing equality holds true when the Taylor series converges absolutely. As discussed below in further detail, the function in Equation 2 is analytic at any given point and therefore holomorphic (i.e., a complex function that is complex differentiable) at any given point. As a result, the Taylor series of a holomorphic function converges to its function value.

Regarding Equation 2 supra, for any $m \in \mathbb{Z}_{>0}$, all of the following four conditions are true: (1) $p_m \in \mathbb{R}[\lambda_1, \ldots \lambda_N]$ of Equation 2 is a homogeneous polynomial in the Hamiltonian term coefficients of total degree m; (2) $p_m$ involves $\lambda_b$ only if $\mathrm{dist}_\mathfrak{G}(a, b) \leq m$; (3) $p_m$ consists of at most $(4\mathfrak{d})^{m+1}$ terms; and (4) the coefficient in front of any monomial of $p_m$ is at most $(2(\mathfrak{d}+1))^{m+1}$ in magnitude. Moreover, considering that every operator $E_a$ is a tensor product of Pauli matrices and that the dual interaction graph $\mathfrak{G}$ as a random-access dictionary, where each node b can be queried to receive a list of its neighbors in unit time and the list is given as a random-access array, the following two conditions are true for every $m \in \mathbb{Z}_{>0}$: (1) the list of monomials that appear in $p_m$ of Equation 2 can be enumerated in time complexity $O(m \mathfrak{d} C)$, where C is the number of monomials (e.g., in time $0(m \mathfrak{d} (4\mathfrak{d})^m))$; and (2) if each operator $E_a$ is supported on at most L number of the particles 106, then each coefficient of $p_m$ is computed exactly s a rational number in time $(8^m + L)\mathrm{poly}(m)$.

The Gibbs state g of the Hamiltonian $\{(a, E_a, \lambda_a)\}$ at inverse temperature $\beta > 0$ is represented by the following Equation 3:

$$g = \frac{e^{-\beta \Sigma_a \lambda_a E_a}}{\mathrm{Tr}(e^{-\beta \Sigma_a \lambda_a E_a})} \qquad [3]$$

which is a Taylor series expansion involving the Hamiltonian $\Sigma_{a \in [M]} \lambda_a E_a$.

Although the terms of Equations 2 and 3 can be calculated, such calculations become unreasonably complicated as the degree of β increases, so another approach is adopted to approximately invert the function $x \mapsto \langle E_a \rangle(x)$ on the estimates $\langle E_a \rangle(x)$. Specifically, the complex differentiability (holomorphicity) of the function $\beta \mapsto \log(\mathrm{Tr}(e^{-\beta H}))$ is utilized to implement a series expansion of a logarithmic partition function. The Hamiltonian $\{(a, E_a, \lambda_a)\}$ is thus represented in terms of a partition function by the following Equation 4:

$$F = \log\left(Tr\left(e^{\wedge}\left(-\beta \sum_{a \in [M]} \lambda_a E_a\right)\right)\right) \quad [4]$$

The relationship in the following Equation 5 defines a relationship between Equation 2 and Equation 4:

$$\frac{Tr(E_a e^{-\beta H})}{Tre^{-\beta H}}\bigg|_{\lambda=\xi} = -\frac{1}{\beta}\frac{\partial F}{\partial \lambda_a} = -\frac{1}{\beta}\frac{\partial}{\partial \lambda_a}\log\left(Tr(e^{-\beta H})\right)\bigg|_{\lambda=\xi} \quad [5]$$

for any $\alpha$ and any $\beta \neq 0$. Therefore, the Taylor series expansion of Equation 2 can be expressed as a logarithmic partition function, which is a complex-valued function of $\beta$, $\lambda_1, \ldots, \lambda_M$. The logarithmic partition function of Equation 5 can be represented as a multivariate Taylor series expansion on the right half complex plane of $\beta$.

As shown in greater detail below, the multivariate Taylor series expansion of F is expressed by the following Equation 6:

$$F = \sum_{m \geq 0} \sum_{V:|V|=m} \frac{1}{V!}\underbrace{\prod_{a \in V}\lambda_a^{\mu(a)}}_{\tilde{\lambda}^V}\underbrace{\left(\prod_{a \in V}\frac{\partial^{\mu(a)}}{\partial \lambda_a^{\mu(a)}}\right)\bigg|_{\lambda_a=0} F}_{\tilde{\mathcal{D}}_V} = \sum_{m \geq 0}\sum_{V:|V|=m}\frac{\lambda^V}{V!}\mathcal{D}_V F \quad [6]$$

wherein V is a cluster that includes a set of tuples (a, $\mu(a)$) where $a \in [M]$ and $\mu(a) > 0$ is the multiplicity of a. The total weight, denoted as [V], of V is $\Sigma_a \mu(a)$; $a \in V$ if $\mu(a)$ is nonzero; and the support of V is defined to be $\{a \in \mathfrak{G} : \mu(a) \geq 1\}$. The combinatorial factor V! corresponds to the function $\Pi_{a \in V}\mu(a)!$ where a ranges over the support of V, supp(V). Also, in Equation 6, a cluster derivative is introduced and defined by the following Equation 7:

$$\mathcal{D}_V = \Pi_{a \in V}\frac{\partial^{\mu(a)}}{\partial \lambda_a^{\mu(a)}}\bigg|_{\lambda_1=\ldots=\lambda_M=0}. \quad [7]$$

The number of all clusters V given a total weight |V| is at least the combinatorial factor $$\binom{M}{m},$$

which is too large a number in view of the conditions described above with respect to Equation 2, where the bounds are independent of M.

In at least some embodiments, the connected clusters W are processed in connection with Equation 6 and disconnected clusters are not processed. A cluster W={(a, $\mu(a)$)} corresponding to a cluster V is defined as being connected if the induced subgraph of $\mathfrak{G}$ by the support $\{a \in \mathfrak{G} | \mu(a) \geq 1\}$ is connected. As a result, the number of all connected clusters W such that $P \in W$ and $|W|=w$ is at most $e^2 d(1+e\mathfrak{d}-1))^{w-1}$, wherein $w \in \mathbb{Z}_{<0}$, $\mathfrak{d} \geq 2$; and a is a node of $\mathfrak{G}$. Therefore, the number of clusters processed in Equation 6 can be significantly reduced relative to the total number of clusters V. Moreover, for any connected cluster W of total weight $m+1 \geq 1$, then $$\left|\frac{1}{W!}\mathcal{D}_W F\right| \leq \left(2\beta e^{\mathfrak{d}+1}\right)^{m+1},$$

which is an upper bound on the magnitude of any given cluster derivative.

At 208, the method 200 includes outputting Hamiltonian coefficient estimates 124 for the Hamiltonian H. The Hamiltonian coefficient estimates 124 outputted in 208 correspond to the Hamiltonian coefficient estimates $\hat{\lambda}$ generated as described with respect to the method 300 and elsewhere herein. At 208, all of the elements of coefficient estimates $\hat{\lambda}$ have been calculated and the Hamiltonian coefficient estimates $\hat{\lambda}$ may be provided as an output—for example, as an output of the Hamiltonian Learning Engine 122 or the controller 102.

Figure 3:
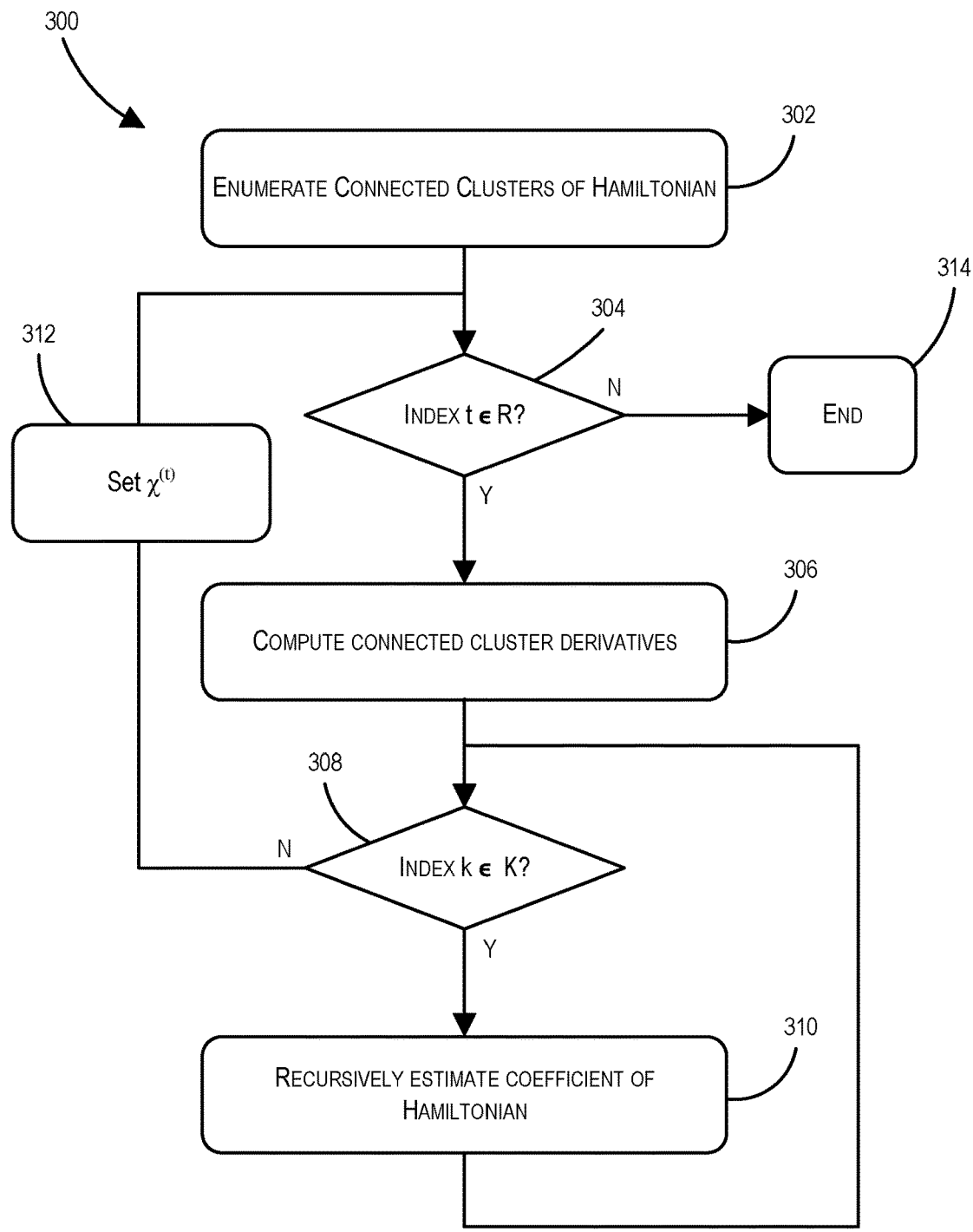
FIG. 3 illustrates a method for inverting a function on estimates of expectation values according to one or more embodiments.

FIG. 3 shows a method 300 of inverting the function $x \mapsto \langle E_a \rangle(x)$ on the estimates to find estimates $\hat{\lambda}$ of the coefficients $\hat{x}$ according to one or more embodiments. The method 300 is performed in view of the foregoing aspects of and relating to Equation 6, and may be performed by one or more entities described herein, such as the decoding unit 120, and/or the controller 102. As previously indicated, the following description is considering a Hamiltonian $\{(a, E_a, \lambda_a): a=1, 2, \ldots, M\}$, where the operators $E_a$ are Pauli. One or more initial conditions may be set in connection with initiation of the method 300. For example, a first index t is initialized to zero; a second index k is initialized to zero; and a vector $x^{(t)}$ is initialized to $\vec{0}$ for $x^{(t)} \in \mathbb{R}^M$. In some embodiments, the value of the first index t may be incremented from the initial value after the initial conditions are set.

At 302 of the method 300, the clusters V of the Hamiltonian H are enumerated. In particular, clusters of total weight m at a node $a \in \mathfrak{G}$ (the graph) are enumerated according to a method described with respect to FIG. 4 below. At 304, the method 300 includes determining whether the first index t is at most R:

$$R = \left\lceil \log\left(\frac{3}{16\beta e \mathfrak{d}^6 T^3}\right) \right\rceil - 1$$

wherein $T=(2e)^{\mathfrak{d}+2}$ and $\mathfrak{d}$ is the maximum degree of the graph $\mathfrak{G}$.

In response to the method 300 reaching 304 for the first time, a timer may be initiated causing the timer to constantly increment in value. In some embodiments, the timer may increment by a decimal amount—such as by incrementing in approximately a certain number of microseconds for every clock cycle. In some embodiments, the timer may increment by a set amount corresponding to an integer value, such as by increasing the value of the timer by one for each second elapsed. If the first index r belongs to the set R, then the method proceeds to 306.

At 306, the method 300 includes computing cluster derivatives for the clusters enumerated in 304. A method for computing cluster derivatives is described in detail with respect to FIG. 5 below. As a result of computing the cluster derivatives in 306, the method 300 proceeds to 308. At 308, the method 300 includes determining whether the second index k belongs to a set K, the set $K \in \mathbb{Z}$ and having an upper bound $$\left\lceil \log\left(\frac{T}{\beta\varepsilon}\right) \right\rceil.$$

On the first iteration of 308, the second index k is If so, the method 300 proceeds to 310.

At 310, the method 300 includes recursively estimating a root of a logarithmic partition function. In 310, a modified version of Newton's method is implemented using a Taylor series expansion to avoid computing the inverse of the Jacobian J, $J^{-1}$, explicitly. In some traditional implementations, Newton's method involves performing iterations of $x^{(t+1)}=x^{(t)}-(j^{-1}\mathcal{F})(x^{(t)})$, wherein the Jacobian inverse $J^{-1}$ is explicitly calculated to achieve a result in each iteration. The modified version of Newton's method implemented herein by contrast, avoids computing the inverse of the Jacobian J of $\mathcal{F}$ explicitly.

Specifically, the Jacobian inverse $J^{-1}$ is represented by the Taylor series expansion shown in the following Equation 8:

$$J^{-1} = -\frac{1}{\beta}\sum_{k=0}^{\infty}(I+\beta^{-1}J)^{k} \qquad [8]$$

wherein k is an integer value, and I is an identity matrix. Using the Taylor series expansion of Equation 8, the following Equation 9 is iteratively performed in 310 for successive values of t:

$$x^{(0)} = \vec{0} \quad x^{(t+1)} = x^{(t)} + \beta^{-1}\sum_{k=0}^{K}(I+\beta^{-1}J(x^{(t)}))^{k}\mathcal{F}(x^{(t)}) \qquad [9]$$

For the first iteration of 310, a vector $v^{(0)}$ is initialized to $\mathcal{F}(x^{(t-1)})$ for $v^{(0)}\in\mathbb{R}^{M}$. In some embodiments, the value of the second index k may be incremented from the initial value after the vector $v^{(k)}$ is initialized. Then, the first iteration of 310 is performed such that a vector $v^{(k)}$ is evaluated with the second index k=1 for the following Equation 10:

$$v^{(k)}=(I+\beta^{-1}J(x^{(t-1)}))v^{(k-1)}$$

$$w^{(-1)}=0$$

$$w^{(k)}=v^{(k)}+w^{(k-1)} \qquad [10]$$

wherein $\mathcal{F}$ and J are provided from corresponding values calculated in 306 of the logarithmic partition function of $\mathcal{F}$ the Hamiltonian and the Jacobian J. After the first iteration and each iteration thereafter, the second index k is incremented by one and $v^{(k)}$ is evaluated for the next k. As a result of determining that the second index $k\notin K$ in 308, the method 300 proceeds to 312.

At 312, the method 300 includes setting $x^{(t)}$ based on a result of recursively estimating a value for an element of $\hat{\lambda}$—particularly a value of the coefficient $\lambda'$. With reference to Equations 9 and 10, a variable $x^{(t)}$ is assigned according to the following Equation 11:

$$x^{(t)}=x^{(t-1)}+\beta^{-1}v^{(k)} \qquad [11]$$

At 312, the method 300 may also include resetting a value of the second index k to zero and incrementing a value of the first index t. The method 300 then proceeds back to 304.

At 304, the method 300 includes determining whether the first index t belongs to the set R. If so, the method 300 proceeds again as described above with a different value for the first index t. If it is determined in 304 that the first index t does not belong to the set R (i.e., $t\notin R$), then the method 300 proceeds to 314, wherein the method 300 is discontinued.

Figure 4:
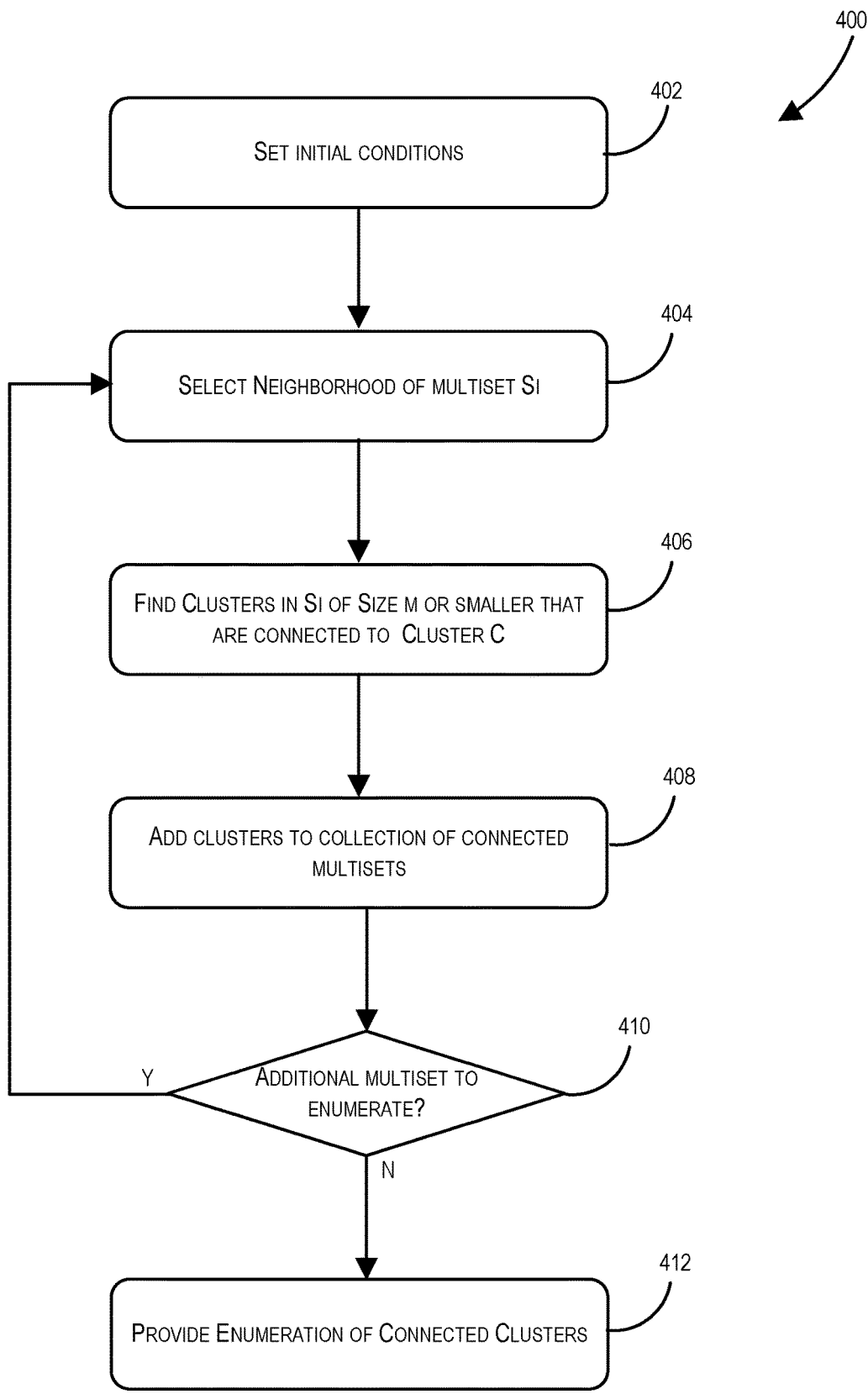
FIG. 4 illustrates shows a method for enumerating clusters of the Hamiltonian according to one or more embodiments.

FIG. 4 shows a method 400 of enumerating the clusters V according to one or more embodiments. Features of the method 400 are recursively performed until certain conditions are satisfied. In the method 400, a breadth-first search is performed starting at a to produce the disjoint sets $V_i$ for $i\in\{0, 1, \ldots, m\}$, where $V_i$ is the set of nodes that are a number of nodes i away from a in graph distance. In connection with this search, a directed tree G=(V, E) may be generated with vertices $V=V_0\sqcup\cdots\sqcup V_{m-1}$ and directed edges E including the set of nodes (u, v) if the respective edges are in $\mathfrak{G}$ and v is at a lower level than u (so $u\in V_i$ and $v\in V_{i+1}$). Because G is a directed tree, a neighbor of $u\in V_i$ is in $V_{i+1}$. For an $S\subset V$, $\Gamma(S)$ is the neighborhood of S in the directed tree G. If S is a multiset, then $\Gamma(S)$ is the G-neighborhood of the support $SuppS=\{a\in\mathfrak{G}|a\in S\}$. Every cluster V can be represented uniquely as a collection of multisets $S_i$ of vertices $V_i$ for $i\in\{0, 1, \ldots, m-1\}$ satisfying that there is a G-edge in the directed tree G between every node in the multiset $S_i$ to another node in the multiset $S_{i+1}$.

At 402 of the method 400, initial conditions are set; for instance, the initial conditions may be set such that the vertex $V_0$ is selected and an initial size is m. At 404 of the method 400, a neighborhood $\Gamma(S_i)\subseteq V_{i+1}$ of a multiset $S_i$ is selected for consideration. At 406 of the method 400, the clusters in the neighborhood $\Gamma(S_i)$ of size m are found and enumerated. Moreover, 406 may be recursively performed to identify all possible continuations of the multiset $S_i$ on the neighborhood $\Gamma(S_i)$, where each successive iteration has a size $m_{i+1}=m_i-|S_i|$ relative to the previous size $m_i$ and $|S_i|$ is the cardinality of the multiset $S_i$.

At 408 of the method 400, the connected clusters identified in 406 are added to a list C of connected clusters. At 410, the method 400 may further include determining whether there are additional multisets $S_i$ to be enumerated. If so, the method 400 includes returning to 404 to select another multiset $S_i$—for example, by incrementing an index i. If there are no additional multisets $S_i$ to be enumerated in 410, the method 400 proceeds to 412, where all continuations or connected clusters in the list C are provided as an output resulting from the method 400.

Figure 5:
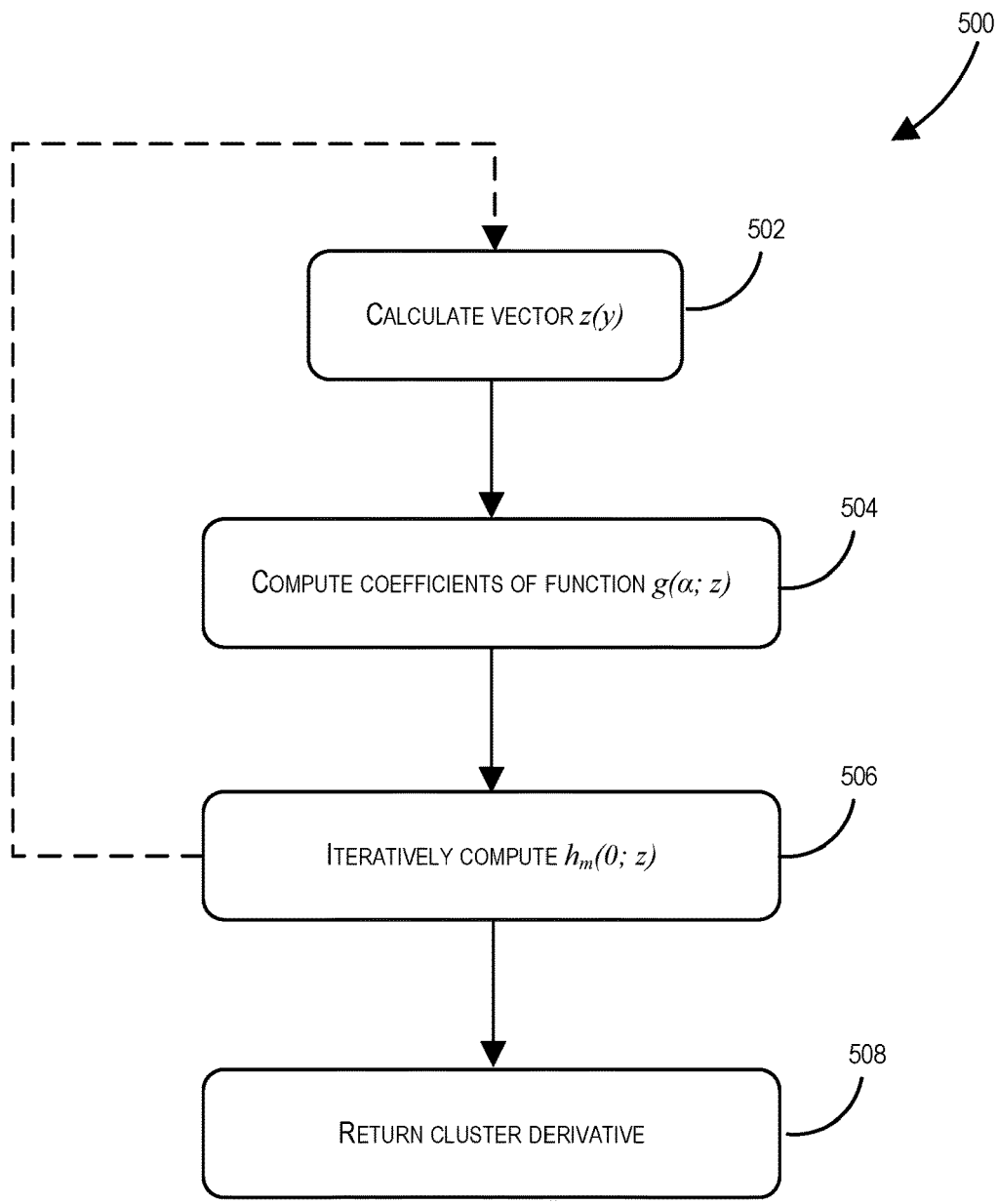
FIG. 5 illustrates a method for evaluating cluster derivatives using the enumerated clusters according to one or more embodiments.

FIG. 5 shows a method 500 of evaluating cluster derivatives using the clusters W enumerated in 302. The method 500 involves processing a cluster $W=\{(a, \mu(a))\}$ of a total weight m+1 and associated Pauli operator $E_a$ with $a\in W$, and further involves using the estimates $\hat{E}_a$ obtained in 204, which are faithful representations on m+1 particles 106 (e.g., qubits) for $E_a$. At 502 of the method 500, a vector z(y) is computed for any $y\in\{0,1\}^\mu$ where $\mu=\mu_1+\mu_2+\ldots+\mu_n$; y is an integer vector $y=y_1, \ldots y_n)\in\mathbb{Z}^n$; and $z(y)\in\mathbb{Z}_{\geq 0}^n$. The vector z(y) is computed such that the $z(y)_k$ term of z(y) corresponds to the following Equation 12:

$$z(y)_k=y_{\mu_1+\ldots+\mu_{k-1}+1}+y_{\mu_1+\ldots\mu_{k-1}+2}+\ldots+y_{\mu_1+\ldots+\mu_k} \qquad [12]$$

In other words, each of the components of y are organized into n groups of sizes $\mu_k$. Then, the numbers in each respective group are added to produce the vector z(y).

At 504, the method 500 includes calculating the coefficients of a function g (a; z) using the estimates $\hat{E}_a$ obtained in 204 of the method 200. For a fixed z, the function g(a; z) is a polynomial in a, as shown in the following Equations 13 and 14:

$$g(\alpha; z) = 1 + g(; z)_1 \alpha + \ldots + g(; z)_n \alpha \quad [13]$$

$$g(; z)_k = \frac{(-1)^k}{k!} \frac{1}{D} Tr\left[\left(\sum_{j=1}^{n} z_j \hat{E}_j\right)^k\right] \quad [14]$$

wherein Equation 14 is a Taylor series expansion of Equation 13 for all k. Equation 14 also utilizes the vector z(y) of Equation 12 and the estimates $\hat{E}_a$ obtained in 204. In 504, the coefficients $g(; z)_k$ of Equation 14 are computed using the estimates $\hat{E}_a$.

At 506, the method 500 includes iteratively computing a function $h_m(0; z)$ using the following Equation 15 while keeping only an number m lowest order terms in a:

$$h_t = h'_{t-1} g - t h_{t-1} g' \quad [15]$$

where $h_0 = g'$. Equation 15 is iterated until we have a number (m−t) terms in $h_t$, at which point the method 500 proceeds to 508. At 508, a value $(-1)^{1+\lfloor y \rfloor h_t}$ is appended to an output for the method 500, where the output of the method is a rational number corresponding to $$\frac{1}{\beta^{m+1} W!} \mathcal{D}_W F.$$

The method 500 may be repeated a number of times until a condition $y \in (0, 1)^{m+1}$ is no longer satisfied. At 508, as a result of the foregoing condition no longer being satisfied, a rational number corresponding to a cluster derivative is returned as at least part of an output for 306 of the method 300.

Advantageously, the methods and systems disclosed herein for learning a Hamiltonian H of a quantum device improve robustness to decoherence and also reduce the sample complexity and the time complexity associated with learning the Hamiltonian. In particular, methods and systems disclosed herein improve the sample complexity involved in learning a Hamiltonian to $$O\left(\frac{N \log(N)}{\beta^2 \varepsilon^2}\right)$$

copies of the Gibbs state ρ, where N is the number of particles 106, β is the inverse temperature of the quantum device 104, and ε is the $\ell_2$ error. By contrast, the sample complexity required to learn a Hamiltonian in at least some previously implemented techniques is $$O\left(\frac{2^{poly(\beta)} N^3 \log N}{\beta^c \varepsilon^2}\right)$$

Additionally, methods and systems disclosed herein also improve the time complexity involved in learning a Hamiltonian to $$O\left(\frac{N^2 \log(N)}{\beta^2 \varepsilon^2}\right).$$

One or more embodiments herein facilitate the characterization of physical properties of a quantum device in the presence of noise. Moreover, embodiments of the methods and systems herein are applicable to learn the Hamiltonian in scenarios in which decoherence would have been a significant issue in previously implemented solutions. Further, one or more embodiments of the present disclosure enable a non-quantum computer to certify a Gibbs state of a known Hamiltonian by implementing the Hamiltonian learning systems and methods disclosed herein.

Figure 6:
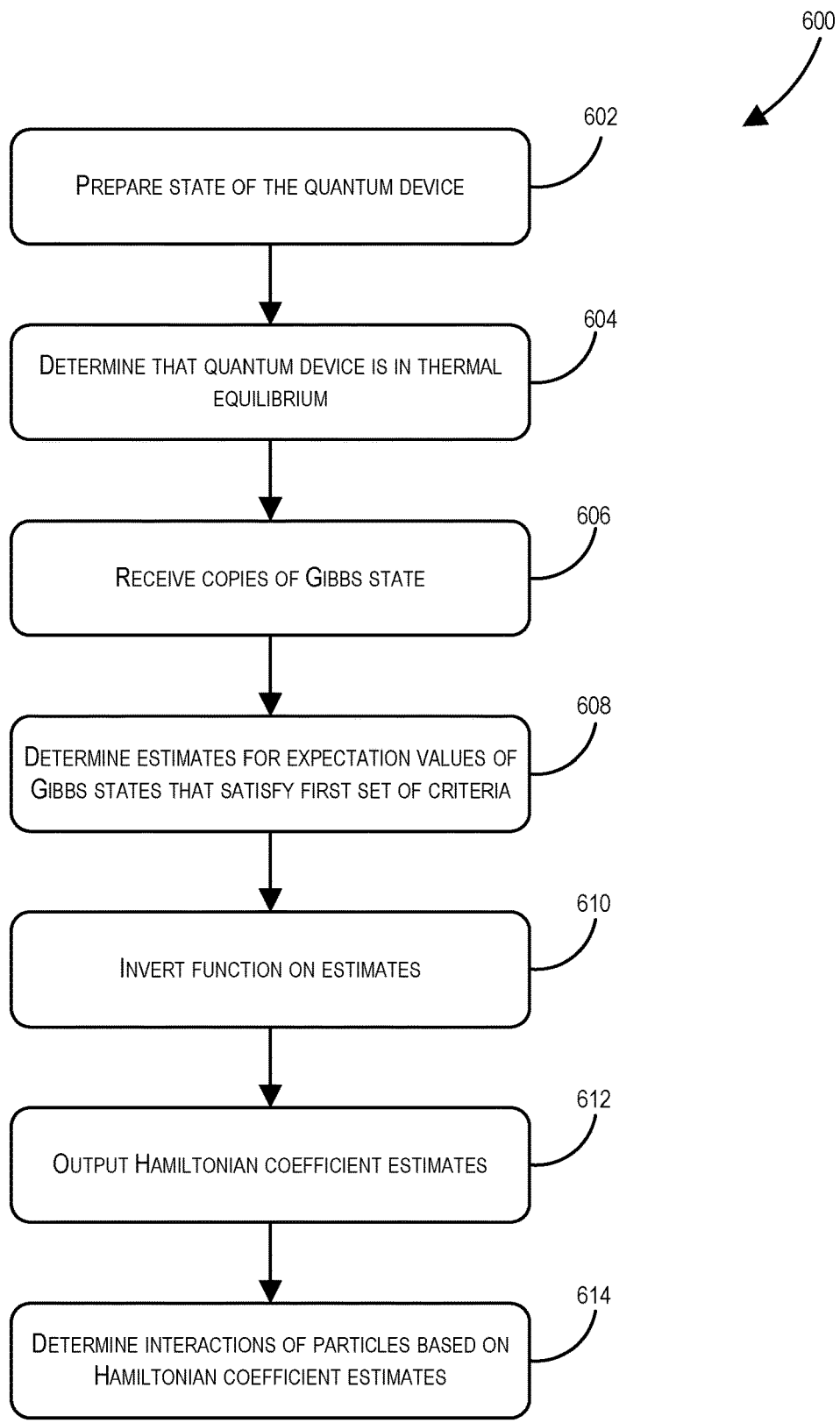
FIG. 6 illustrates a method for characterizing one or more physical properties of a quantum device.

FIG. 6 illustrates a method 600 for characterizing one or more physical properties of a quantum device, such as the quantum device 104. In a physical lab, the system 100 of FIG. 1 may be implemented to determine one or more physical properties of the quantum device 104. To achieve this, the controller 102 may control the quantum device 104 via the interface 112 to prepare the particles 106 in a certain state. For instance, a spin system of the quantum device 104 is prepared such that a set of the particles 106 has one or more set spin states. Via the method 600, a user (e.g., physicist) may operate the system 100 to determine interactions between two or more of the particles 106, such as interactions of the spin system (e.g., spin-spin interactions, spin-orbit interactions). Quantum mechanics dictate that the interactions of the spin state are governed by a local Hamiltonian such that, if the spin system is at thermal equilibrium with the environment, then the stationary state must be a Gibbs state. As a result, the Hamiltonian information 124 may be generated according to the method 600 to determine one or more physical properties of the quantum device 104 at thermal equilibrium at the high temperature β.

Various features in the method 600 are described elsewhere herein so further description is omitted for brevity. At 602, the method 600 includes preparing a state of the quantum device 104. Preparing the state in 602 may include preparing one or more quantum states of the particles 106, such as spin, position, momentum, or connections between two or more of the particles 106 (e.g., quantum logic gates). Preparing the state in 602 may also include setting a temperature of the chamber 114 to the high inverse temperature β. At 604, the method 600 includes determining that the quantum device 104 is in thermal equilibrium. The determination in 604 may include obtaining measurements, by the controller 102, and determining whether measured temperatures of the quantum device 104 are within a defined threshold for a defined number of samples or over a defined time period. As a result of determining that the quantum device 104 is in thermal equilibrium, the method 600 proceeds to 606.

At 606, the method 600 includes receiving a plurality of copies 119 of the Gibbs state ρ, as described herein with respect to 202 of the method 200 (see FIG. 2) and elsewhere herein. At 608, the method 600 includes determining estimates for expectation values of the Gibbs state ρ copies 119, as described with respect to 204 of the method 200. At 610, the method 600 includes inverting the function $x \mapsto \langle E_a \rangle (x)$ on the estimates to find estimates of the coefficients $\hat{x}$, as describe with respect to 206 of the method 200 and elsewhere herein. At 612, the method 600 includes outputting the Hamiltonian coefficient estimates 612 as described with respect to 208 of the method 200. For instance, the controller 102 may receive the Hamiltonian coefficient estimates 124 from the Hamiltonian learning engine 122.

At 614, the method 600 includes determining interactions of a set of the particles 106 based on the Hamiltonian coefficient estimates 124 outputted in 612. For instance, the controller 102 may be configured (e.g., via execution of program instructions, via hard wired logic) to process the Hamiltonian coefficient estimates 124 and determine interactions between two or more of the particles 106 based on the Hamiltonian coefficient estimates 124. The one or more interactions determined in 614 correspond, in at least some embodiments, to physical properties of the quantum device 104. By way of non-limiting example, such physical properties may include a superconducting critical temperature, electron mobility, hole mobility, magnetic susceptibility, and so forth. The method 600 may be implemented to determine interactions other than spin state, such as spin-orbit interaction, degrees of freedom, light-matter interactions, and entanglement, also by way of non-limiting example.

Embodiments disclosed herein may be implemented to certify or validate at least some operational aspects of the quantum device 104. For instance, the quantum device 104 may be a quantum processor on which a quantum algorithm is performed. To verify or certify that the quantum algorithm performs as expected, either in general or on the quantum processor specifically, the quantum processor may be operated to create a Gibbs state ρ that corresponds to a known Hamiltonian $H_K$. Then, the Hamiltonian learning process described herein may be implemented to verify that the quantum processor performs as intended based on the Hamiltonian coefficient estimates 124.

Figure 7:
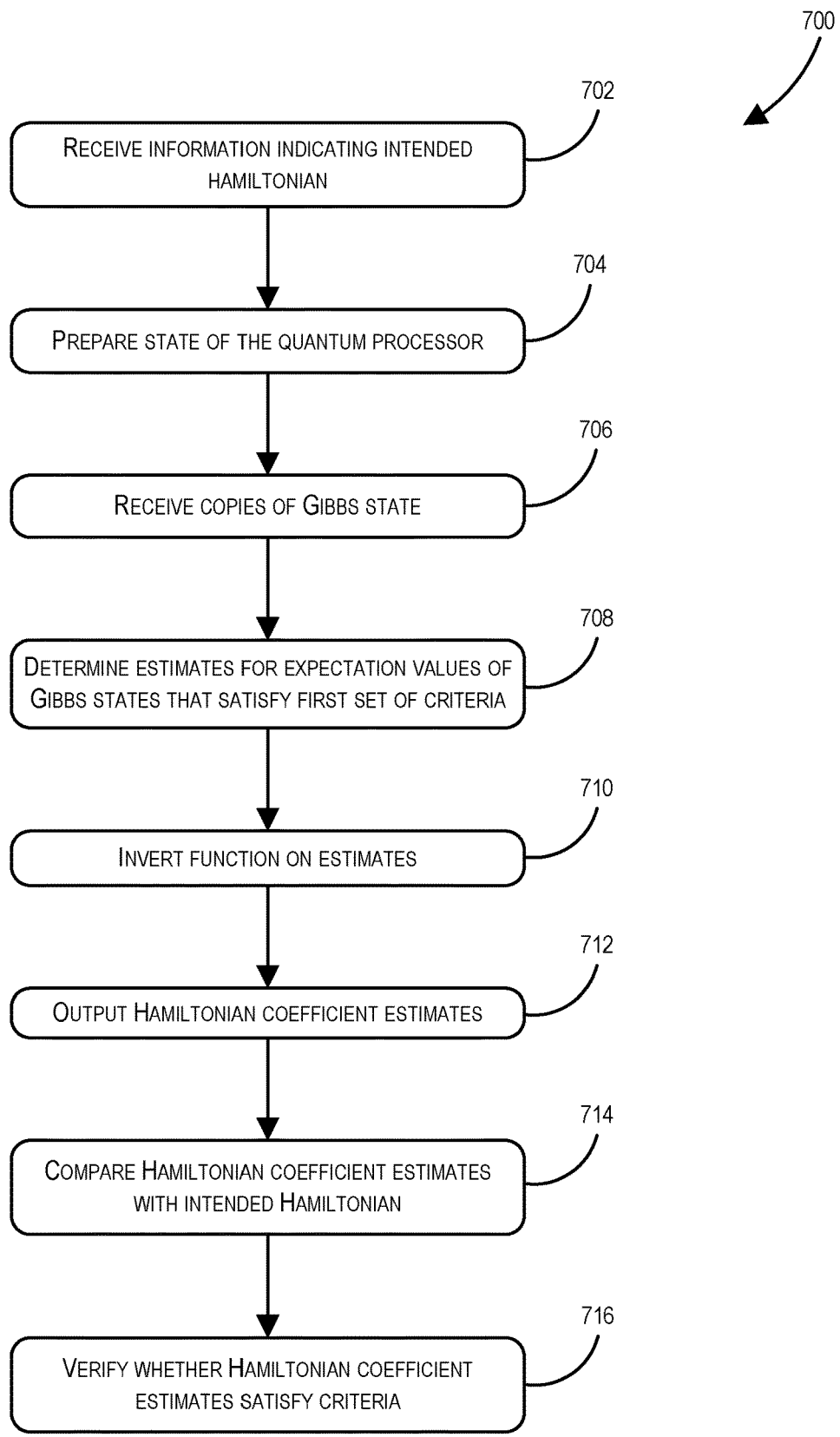
FIG. 7 illustrates a method for verifying operation of a quantum processor according to one or more embodiments.

FIG. 7 shows a method 700 for verifying operation of a quantum processor according to one or more embodiments. Various features in the method 700 are described elsewhere herein so further description is omitted for brevity. At 702, the method 700 includes receiving information indicating an intended Hamiltonian H to be achieved as a result of executing a quantum algorithm on the quantum processor—for instance, the intended Hamiltonian 128 described with respect to FIG. 1. The information received in 702 may specify intended values or ranges for the coefficients α of the intended Hamiltonian H and may specify intended expectation values $E_a$ of the intended Hamiltonian H.

At 704, the method 700 includes preparing a state of the quantum device 104. Preparing the state of the quantum processor in 704 may include executing a quantum algorithm on the quantum processor such that the quantum processor reaches an intended or expected Gibbs state ρ. For instance, executing the quantum algorithm may include setting a state of a set of qubits (particles 106) of the quantum processor, establishing couplings between qubits, and/or operating quantum logic gates to transform a state of the qubits. In some embodiments, preparing the state in 700 may include evolving the quantum state of the quantum processor according to the quantum algorithm—for example, by evolving the Hamiltonian H over time. In some embodiments, preparing the state of the quantum device 104 may include determining that the quantum device 104 is in thermal equilibrium, as described with respect to 604 of the method 600 and elsewhere herein.

At 706, the method 700 includes receiving a plurality of copies 119 of the Gibbs state ρ, as described herein with respect to 202 of the method 200 (see FIG. 2) and elsewhere herein. At 708, the method 700 includes determining estimates for expectation values of the Gibbs state ρ copies 119, as described with respect to 204 of the method 200. At 710, the method 700 includes inverting the function $x \mapsto \langle E_a \rangle(x)$ on the estimates to find estimates of the coefficients $\hat{x}$, as describe with respect to 206 of the method 200 and elsewhere herein. At 712, the method 700 includes outputting the Hamiltonian coefficient estimates 712 as described with respect to 208 of the method 200. For instance, the controller 102 may receive the Hamiltonian coefficient estimates 124 from the Hamiltonian learning engine 122.

At 714, the method 700 includes verifying whether the Hamiltonian coefficient estimates 124 sufficiently correspond with an intended Hamiltonian 128. For instance, the controller 102 may compare each element of the Hamiltonian coefficient estimates 124 with a corresponding element of the intended Hamiltonian 128 (e.g., an element of the intended Hamiltonian 128 in the same row and same column as the element of the Hamiltonian coefficient estimates 124 being examined). For each comparison, the controller 102 determines whether the element of the Hamiltonian coefficient estimates 124 satisfy a set of verification criteria. The set of verification criteria may specify one or more numerical ranges for verifying elements of the Hamiltonian coefficient estimates 124 against corresponding elements of the intended Hamiltonian 128.

At 716, the method 700 includes verifying whether the Hamiltonian coefficient estimates 124 satisfy the set of verification criteria with respect to the intended Hamiltonian 128. The set of verification criteria may specify one or more numerical ranges or conditions for verifying elements of the Hamiltonian coefficient estimates 124 against corresponding elements of the intended Hamiltonian 128. For instance, the controller 102 may verify that an element A of the Hamiltonian coefficient estimates 124 is verified against the corresponding element B of the intended Hamiltonian 128 as a result of the element A being within a specified numerical range of the element B. In some embodiments, the set of verification criteria may specify that the element A is verified as a result of determining an exact match between numerical values of the element A and the element B. In 716, the controller 102 may verify the quantum algorithm 126 and/or operation of the quantum device 104 as a result of determining that the Hamiltonian coefficient estimates 124 satisfy the verification criteria relative to the intended Hamiltonian 128. On the other hand, the controller 102 may reject verification of the quantum algorithm 126 and/or the quantum device 104 as a result of the elements of the Hamiltonian coefficient estimates 124 failing to satisfy the verification criteria relative to the intended Hamiltonian 128.

Figure 8:
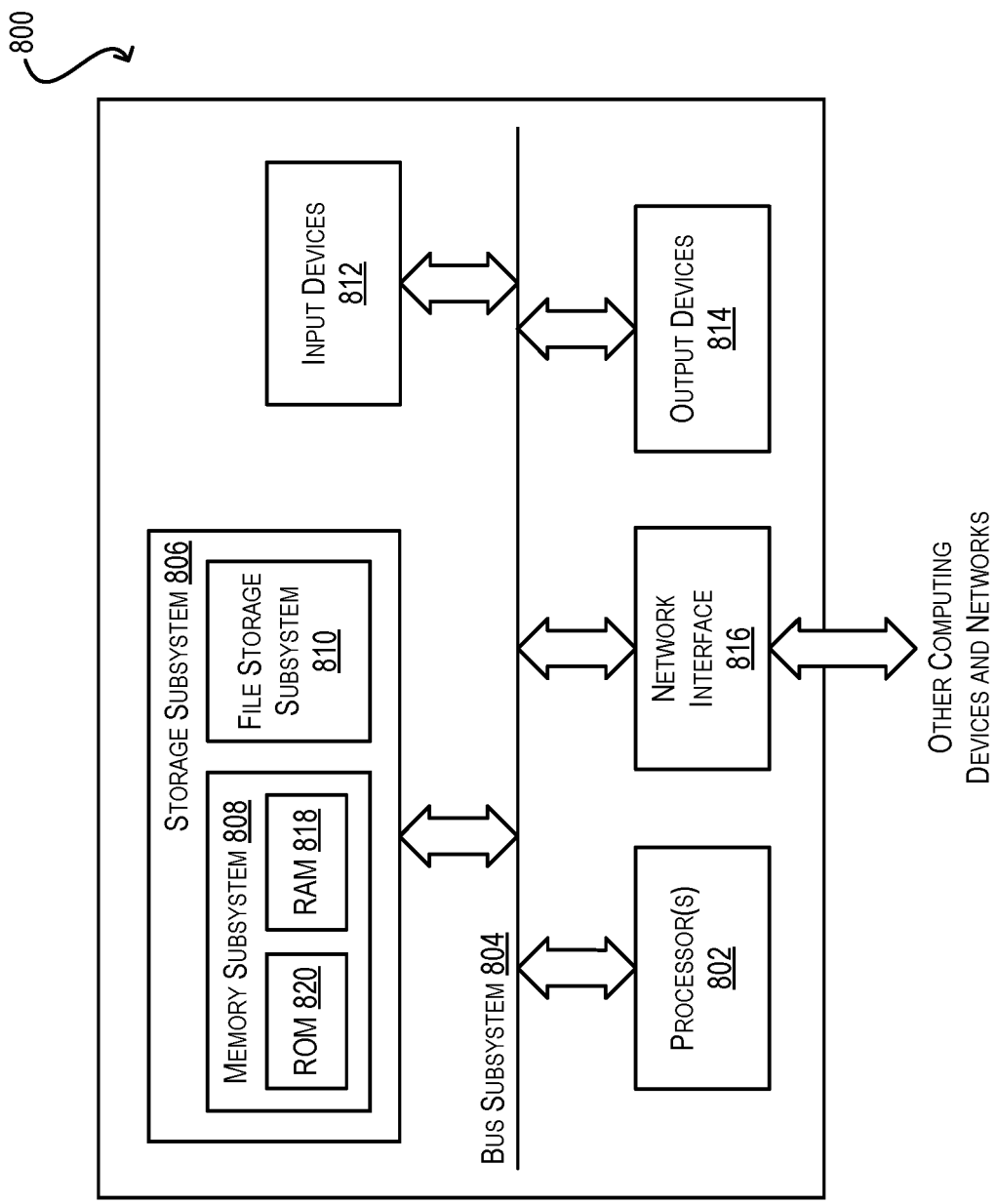
FIG. 8 illustrates a simplified block diagram of an example computer system according to one or more embodiments.

FIG. 8 depicts a simplified block diagram of an example computer system 800 according to certain embodiments. Computer system 800 can be used to implement any of the computing devices, systems, or servers described in the foregoing disclosure. As shown in FIG. 8, computer system 800 includes one or more processors 802 that communicate with a number of peripheral devices via a bus subsystem 804. These peripheral devices include a storage subsystem 806 (comprising a memory subsystem 808 and a file storage subsystem 180), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., an Ethernet card, a Wi-Fi and/or cellular adapter, a modem (telephone, satellite, cable, ISDN, etc.), digital subscriber line (DSL) units, and/or the like.

User interface input devices 812 can include a keyboard, pointing devices (e.g., mouse, trackball, touchpad, etc.), a touchscreen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Storage subsystem 806 includes a memory subsystem 808 and a file/disk storage subsystem 810. Subsystems 818 and 820 represent non-transitory computer-readable storage media that can store program code and/or data that provide the functionality of embodiments of the present disclosure.

Memory subsystem 808 includes a number of memories including a main random-access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

FURTHER EXAMPLE EMBODIMENTS

In various embodiments, the present disclosure includes systems, methods, and apparatuses for learning a Hamiltonian of a quantum device. The techniques described herein may be embodied in non-transitory machine-readable medium storing a program executable by a computer system, the program comprising sets of instructions for performing as described herein. In some embodiments, a system includes one or more processors and a non-transitory machine-readable medium storing instructions that when executed by at least one of the one or more processors cause at least one of the one or more processors to perform as described herein. In some embodiments, the non-transitory machine-readable medium may be memory, for example, which may be coupled to the aforementioned one or more processors, for example.

The following techniques may be embodied alone or in different combinations and may further be embodied with other techniques described herein.

For instance, in some embodiments, the present disclosure includes a computer system comprising a quantum device; one or more processors; and a non-transitory computer readable medium having stored thereon program code executable by the one or more processors. The program code, as a result of execution by the one or more processors, causes the one or more processors to receive a plurality of copies of a Gibbs state of the quantum device in thermal equilibrium at a high-temperature; determine a plurality of estimates for expectation values of the plurality of copies; compute a plurality of cluster derivatives for a plurality of connected clusters of a low-degree Hamiltonian; invert a function on the plurality of estimates based on the plurality of cluster derivatives; and estimate a set of Hamiltonian coefficients associated with the low-degree Hamiltonian of the quantum device, thereby reducing a sample complexity and a time complexity associated with noise-robust characterization of the quantum device.

In some embodiments, execution of the program code causes the one or more processors to prepare a state of the quantum device, and characterize one or more physical properties of the quantum device based on the coefficient estimates. In some embodiments, the sample complexity to estimate the set of coefficient estimates is $$O\left(\frac{N\log(N)}{\beta^2 \varepsilon^2}\right),$$

wherein $\varepsilon$ is error, $\beta$ is an inverse temperature, and N is a number of particles of the quantum device. In some embodiments, the time complexity to estimate the set of coefficients is proportional to a number of sample complexity and a number of particles in a sample, and is $O(N^2 \log(N)/\beta^2 \varepsilon^2)$, wherein $\varepsilon$ is error, $\beta$ is an inverse temperature, and N is a number of particles of the quantum device.

In some embodiments, execution of the program code causing the one or more processors to iteratively compute one or more of the set of Hamiltonian coefficients using a modified version of Newton's method. In some embodiments, the modified version of Newton's method involves a power series expansion of a Jacobian of a logarithmic partition function.

In some embodiments, execution of the program code causes the one or more processors to enumerate the plurality of connected clusters of the low-degree Hamiltonian using the plurality of copies of the Gibbs state, wherein the plurality of cluster derivatives are computed using the plurality of connected clusters enumerated. In some embodiments, the low-degree Hamiltonian is a Hamiltonian for which each operator of the Hamiltonian is supported on a constant number of particles without any geometric constraints. In some embodiments, execution of the program code causes the one or more processors to determine clusters of a dual interaction graph based on the plurality of estimates, wherein the plurality of connected clusters are selected from the clusters.

In some embodiments, the present disclosure includes a computer system comprising a quantum processor; one or more non-quantum processors; and a non-transitory computer readable medium having stored thereon program code executable by the one or more non-quantum processors, the program code causing the one or more non-quantum processors to receive information specifying a first set of coefficients of an intended Hamiltonian for the quantum processor; prepare a state of the quantum processor; receive a plurality of copies of a Gibbs state of the quantum processor; estimate a second set of coefficients of a Hamiltonian using a modified version of Newton's method; perform a comparison between the first set of coefficients and the second set of coefficients; and verify operation of the quantum processor as a result of the comparison satisfying a set of verification criteria.

In some embodiments, the set of verification criteria specifies a numerical range, and execution of the program code causes the one or more non-quantum processors to verify the operation of the quantum processor as a result of one or more coefficients of the first set of coefficients being within the numerical range relative to one or more coefficients of the second set of coefficients. In some embodiments, execution of the program code causes the computer system to determine that the quantum processor is in thermal equilibrium, wherein the plurality of copies of the Gibbs state are received as a result of the determination that the quantum processor is in thermal equilibrium.

In some embodiments, the present disclosure includes a method comprising receiving a plurality of copies of a Gibbs state of a quantum device in thermal equilibrium at a high-temperature; determining a plurality of estimates for expectation values of the plurality of copies that satisfy a defined set of criteria; computing a plurality of cluster derivatives for a plurality of connected clusters of a Hamiltonian; inverting a function on the plurality of estimates based on the plurality of cluster derivatives; and estimating a set of Hamiltonian coefficients of the Hamiltonian of the quantum device, thereby reducing a sample complexity and a time complexity associated with noise-robust characterization of the quantum device.

In some embodiments, the method comprises preparing a state of the quantum device; and characterizing one or more physical properties of the quantum device based on the coefficient estimates. In some embodiments, the method comprises enumerating the plurality of connected clusters of the Hamiltonian using the plurality of copies of the Gibbs state, wherein the plurality of cluster derivatives are computed using the plurality of connected clusters enumerated. In some embodiments, the method comprises iteratively computing one or more of the set of Hamiltonian coefficients using a modified version of Newton's method that involves a power series expansion of a Jacobian of a logarithmic partition function.

In some embodiments, the Hamiltonian is a low-degree Hamiltonian for which each operator of the Hamiltonian is supported on a constant number of particles without any geometric constraints. In some embodiments, a sample complexity to estimate the set of coefficient estimates is $$O\left(\frac{N\log(N)}{\beta^2\varepsilon^2}\right),$$

wherein ε is error, β is an inverse temperature, and N is a number of particles of the quantum device. In some embodiments, the quantum device is a quantum processor.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
    a quantum processor comprising a set of qubits;
    one or more processors; and
    a non-transitory computer readable medium having stored thereon program code executable by the one or more processors, the program code causing the one or more processors to:
        receive a plurality of copies of a Gibbs state of the quantum processor in thermal equilibrium at a temperature;
        determine a plurality of estimates for expectation values of the plurality of copies;
        compute a plurality of cluster derivatives for a plurality of connected clusters of a low-degree Hamiltonian;
        invert a function $x \mapsto (E_a)(x)$ on the plurality of estimates based on the plurality of cluster derivatives, where Ea is an observable and x is an estimate;
        reduce a sample complexity and a time complexity associated with noise-robust characterization of the quantum processor by estimating a set of Hamiltonian coefficients associated with the low-degree Hamiltonian of the quantum processor; and
        in response to estimating the set of Hamiltonian coefficients associated with the low-degree Hamiltonian of the quantum processor, setting a respective state of the set of qubits of the quantum processor.

2. The computer system of claim 1, execution of the program code causing the one or more processors to:
    prepare a state of the quantum processor; and
    characterize one or more physical properties of the quantum processor based on the coefficient estimates.

3. The computer system of claim 1, wherein the sample complexity to estimate the set of coefficient estimates is $$O\left(\frac{N\log(N)}{\beta^2\varepsilon^2}\right),$$

wherein ϵ is error, β is an inverse temperature, and N is a number of particles of the quantum processor.

4. The computer system of claim 1, wherein the time complexity to estimate the set of coefficients is proportional to a number of sample complexity and a number of particles in a sample, and is 0 (N2 log (N)/β2ϵ 2), wherein ϵ is error, ϵ is an inverse temperature, and N is a number of particles of the quantum processor.

5. The computer system of claim 1, execution of the program code causing the one or more processors to:
    iteratively compute one or more of the set of Hamiltonian coefficients using a modified version of Newton's method.

6. The computer system of claim 5, wherein the modified version of Newton's method that involves a power series expansion of a Jacobian of a logarithmic partition function.

7. The computer system of claim 1, execution of the program code causing the one or more processors to:

enumerate the plurality of connected clusters of the low-degree Hamiltonian using the plurality of copies of the Gibbs state, wherein the plurality of cluster derivatives are computed using the plurality of connected clusters enumerated.

8. The computer system of claim 1, wherein the low-degree Hamiltonian is a Hamiltonian for which each operator of the Hamiltonian is supported on a constant number of particles without any geometric constraints.

9. The computer system of claim 1, execution of the program code causing the one or more processors to:
determine clusters of a dual interaction graph based on the plurality of estimates, wherein the plurality of connected clusters are selected from the clusters.

10. A method comprising:
receiving a plurality of copies of a Gibbs state of a quantum processor in thermal equilibrium at a temperature, wherein the quantum processor comprises a set of qubits;
determining a plurality of estimates for expectation values of the plurality of copies;
computing a plurality of cluster derivatives for a plurality of connected clusters of a Hamiltonian;
inverting a function $x \mapsto (E_a)(x)$ on the plurality of estimates based on the plurality of cluster derivatives, where Ea is an observable and x is an estimate;
reducing a sample complexity and a time complexity associated with noise-robust characterization of the quantum processor by estimating a set of Hamiltonian coefficients of the Hamiltonian of the quantum processor; and
in response to estimating the set of Hamiltonian coefficients associated with the low-degree Hamiltonian of the quantum processor, setting a respective state of the set of qubits of the quantum processor.

11. The method of claim 10, comprising:
preparing a state of the quantum processor; and
characterizing one or more physical properties of the quantum processor based on the coefficient estimates.

12. The method of claim 10, comprising:
enumerating the plurality of connected clusters of the Hamiltonian using the plurality of copies of the Gibbs state, wherein the plurality of cluster derivatives are computed using the plurality of connected clusters enumerated.

13. The method of claim 10, wherein the Hamiltonian is a low-degree Hamiltonian for which each operator of the Hamiltonian is supported on a constant number of particles without any geometric constraints.

14. The method of claim 10, comprising:
iteratively computing one or more of the set of Hamiltonian coefficients using a modified version of Newton's method that involves a power series expansion of a Jacobian of a logarithmic partition function.

15. The method of claim 10, wherein a sample complexity to estimate the set of coefficient estimates is $$O\left(\frac{N\log(N)}{\beta^2\varepsilon^2}\right).$$

wherein $\varepsilon$ is error, $\beta$ is an inverse temperature, and N is a number of particles of the quantum processor.

16. A computer system comprising:
a quantum processor;
one or more non-quantum processors; and
a non-transitory computer readable medium having stored thereon program code executable by the one or more non-quantum processors, the program code causing the one or more non-quantum processors to:
receive information specifying a first set of coefficients of an intended Hamiltonian for the quantum processor;
prepare a state of the quantum processor;
receive a plurality of copies of a Gibbs state of the quantum processor;
determine a plurality of estimates for expectation values of the plurality of copies;
invert a function $x \mapsto (E_a)(x)$ on the plurality of estimates, where $E_a$ is an observable and x is an estimate in order to estimate a second set of coefficients of a Hamiltonian using a modified version of Newton's method;
perform a comparison between the first set of coefficients and the second set of coefficients; and
verify operation of the quantum processor as a result of the comparison satisfying a set of verification criteria.

17. The computer system of claim 16, wherein execution of the program code causes the one or more non-quantum processors to:
enumerate a plurality of connected clusters of the Hamiltonian using the plurality of copies of the Gibbs state; and
compute a plurality of cluster derivatives for corresponding connected clusters of the plurality of connected clusters.

18. The computer system of claim 16, wherein the modified version of Newton's method involves a power series expansion of a Jacobian of a logarithmic partition function.

19. The computer system of claim 16, wherein the set of verification criteria specifies a numerical range, and execution of the program code causes the one or more non-quantum processors to verify the operation of the quantum processor as a result of one or more coefficients of the first set of coefficients being within the numerical range relative to one or more coefficients of the second set of coefficients.

20. The computer system of claim 16, wherein execution of the program code causes the computer system to:
determine that the quantum processor is in thermal equilibrium, wherein the plurality of copies of the Gibbs state are received as a result of the determination that the quantum processor is in thermal equilibrium.

* * * * *